US012663061B2

(12) United States Patent
Oku et al.

(10) Patent No.: US 12,663,061 B2
(45) Date of Patent: Jun. 23, 2026

(54) BALL SCREW DEVICE AND ELECTRIC ACTUATOR PROVIDED WITH SAME

(71) Applicant: NTN CORPORATION, Osaka (JP)

(72) Inventors: Yuta Oku, Shizuoka (JP); Akio Kato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 96 days.

(21) Appl. No.: 18/728,595

(22) PCT Filed: Dec. 27, 2022

(86) PCT No.: PCT/JP2022/048355
§ 371 (c)(1),
(2) Date: Jul. 12, 2024

(87) PCT Pub. No.: WO2023/140076
PCT Pub. Date: Jul. 27, 2023

(65) Prior Publication Data
US 2025/0092939 A1     Mar. 20, 2025

(30) Foreign Application Priority Data

Jan. 24, 2022     (JP) ................................. 2022-008503

(51) Int. Cl.
F16H 25/22          (2006.01)
F16H 25/24          (2006.01)
(52) U.S. Cl.
CPC ......... F16H 25/24 (2013.01); F16H 25/2204 (2013.01)
(58) Field of Classification Search
CPC ......... F16H 2025/2481; F16H 25/2209; F16H 25/2204; F16H 25/24
See application file for complete search history.

(56) References Cited

U.S. PATENT DOCUMENTS

| | | | | |
|---|---|---|---|---|
| 2004/0200303 A1* | 10/2004 | Inoue | ................... | F16H 25/2214 |
| | | | | 74/424.75 |
| 2015/0033891 A1* | 2/2015 | Sakaguchi | .......... | F16H 25/2204 |
| | | | | 74/424.87 |
| 2019/0264788 A1* | 8/2019 | Shimizu | ................. | F16H 25/20 |

FOREIGN PATENT DOCUMENTS

| | | |
|---|---|---|
| JP | 2004-197806 | 7/2004 |
| JP | 2005-344831 | 12/2005 |
| JP | 2013-113423 | 6/2013 |
| JP | 2018-74791 | 5/2018 |

OTHER PUBLICATIONS

International Search Report issued Mar. 14, 2023 in corresponding International Application No. PCT/JP2022/048355.
International Preliminary Report on Patentability and Written Opinion of the International Searching Authority issued Jul. 30, 2024 in International (PCT) Application No. PCT/JP2022/048355.

* cited by examiner

*Primary Examiner* — Gregory Robert Weber
(74) *Attorney, Agent, or Firm* — Wenderoth, Lind & Ponack, L.L.P.

(57)                  ABSTRACT

A ball screw device 4 includes a screw shaft 9 having a screw groove 9a formed in an outer peripheral surface, a nut 8 having a screw groove 8a formed in an inner peripheral surface, and a large number of balls 10 arranged between the screw groove 9a of the screw shaft 9 and the screw groove 8a of the nut 8. A ratio $\Delta r/L1$ of a radial gap $\Delta r$, which is a maximum amount of radial movement of the nut 8 with respect to the screw shaft 9, to an axial span L1 between the large number of balls 10 is made larger than $1/2000$.

6 Claims, 4 Drawing Sheets

BALL SCREW DEVICE AND ELECTRIC ACTUATOR PROVIDED WITH SAME

TECHNICAL FIELD

The present invention relates to a ball screw device and an electric actuator provided with the ball screw device.

BACKGROUND ART

Patent Literature 1 below discloses an electric actuator provided with a ball screw device. As illustrated in FIG. 6, the electric actuator includes an electric motor 102 and a ball screw device 106. The ball screw device 106 includes a nut 121 having a screw groove formed in an inner peripheral surface, a screw shaft 122 having a screw groove formed in an outer peripheral surface, and a large number of balls 123 arranged between the screw groove of the screw shaft 122 and the screw groove of the nut 121. The rotational driving force of the motor 102 is decelerated via gears 116 and 117 and transmitted to the nut 121. Then, the rotational motion of the nut 121 is converted into the axial movement of the screw shaft 122 via the balls 123.

In the ball screw device as described above, it is common to make the gaps between the screw grooves of the screw shaft and the ball and between the screw grooves of the nut and the ball as small as possible. For example, the paragraph 0007 of the following Patent Literature 2 describes that the ratio of the radial internal gap (radial gap) of the ball screw device to the ball diameter is set to ⅓₀₀ or less to prevent the ball from getting on the shoulder portion of the screw groove. In addition, the paragraph 0004 of the following Patent Literature 3 describes that it is common to apply an axial preload to the ball screw device in order to reduce the elastic displacement amount with respect to the axial load to increase rigidity. When an axial preload is applied to the ball screw device in this way, the radial gap becomes zero.

CITATIONS LIST

Patent Literatures

Patent Literature 1: JP 2018-74791 A
Patent Literature 2: JP 2013-113423 A
Patent Literature 3: JP 2004-197806 A

SUMMARY OF INVENTION

Technical Problems

In the ball screw device 106 of the electric actuator illustrated in FIG. 6, the screw shaft 122, an axially moving body, is supported from the outer periphery by the nut 121 via the balls 123. No other members (bearings or the like) are provided to support the screw shaft 122 from the outer periphery. The screw shaft 122 is supported from the outer periphery substantially only at contact portions with the balls 123. In this case, there is no problem when a load in the pure thrust direction is applied to an attachment portion 130 at the end portion of the screw shaft 122 to which another member is to be attached. But, when a load having a radial component is applied, the screw shaft 122 may tilt. For example, if a portion of the screw shaft 122, axially separated from the nut 121, is supported by a sliding bearing or the like, the screw shaft 122 can be prevented from tilting even when the above-described load is applied. In order to provide such a sliding bearing, however, it is necessary to significantly change the design of the ball screw device.

According to the verification by the present inventors, it has become clear that, when the radial gap is made small as in the above Patent Document 2 or the radial gap is made 0 as in the above Patent Document 3 in a ball screw device in which a load having a radial component is applied to the screw shaft 122, peeling easily occurs on the surfaces of the screw grooves and the balls, which leads to a shortened life. Such a problem is not limited to a ball screw device of a nut rotation type that converts the rotational motion of the nut into the axial movement of the screw shaft, and may similarly occur in a ball screw device of a screw shaft rotation type that converts the rotational motion of the screw shaft into the axial movement of the nut.

Therefore, an object of the present invention is to prevent the life of a ball screw device from being shortened.

Solutions to Problems

As a result of intensive studies by the present inventors to achieve the above object, it has become clear that, in a ball screw device in which a load having a radial component is applied to an axially moving body, the life of the ball screw device can be prevented from being shortened by intentionally increasing a radial gap, which has been conventionally considered to be preferably as small as possible, and actively providing a tilt error of the axially moving body.

The present invention made based on the above knowledge relates to a ball screw device including a screw shaft having a screw groove formed in an outer peripheral surface, a nut having a screw groove formed in an inner peripheral surface, and a large number of balls arranged between the screw groove of the screw shaft and the screw groove of the nut, one of the screw shaft and the nut being caused to function as a rotating body and the other being caused to function as an axially moving body, in which a tilt error represented by a ratio $\Delta r/L1$ of a radial gap $\Delta r$, which is a maximum amount of radial movement of the nut with respect to the screw shaft, to an axial span L1 between the large number of balls is larger than ½₀₀₀.

By actively providing the tilt error of the axially moving body in this way, a tilt of the axially moving body is allowed when a load having a radial component is applied to the axially moving body, so that early peeling of the surfaces of the balls and the screw grooves can be prevented by avoiding interference between the balls and the screw grooves.

When a tilt of the axially moving body is allowed as described above and if a deflection amount e (see FIG. 4) of a point of action of load provided on the axially moving body becomes excessively large, there may be a problem depending on the application. Therefore, when it is assumed that the axial distance between the point of action of load provided on the axially moving body and the axial central portion of the large number of balls is L2, it is preferable to make the tilt error $\Delta r/L1$ smaller than 0.5/L2. As a result, the deflection amount e of the point of action of load of the axially moving body can be suppressed to 0.5 mm or less (the tolerance class K of JIS B 0419:1991).

The present invention can be applied to, for example, a ball screw device of a nut rotation type in which a nut is caused to function as the rotating body and a screw shaft is caused to function as the axially moving body.

In a case where the axially moving body is not supported from the outer periphery at a portion other than the contact portions with a large number of balls, a load is likely to be applied to the screw grooves and the balls when the axially moving body tilts. Therefore, it is particularly effective to apply the present invention.

When a load including a radial component is applied to the point of action of load of the axially moving body, the axially moving body tilts and a load is likely to be applied to the screw grooves and the balls. Therefore, it is particularly effective to apply the present invention.

An electric actuator, including the ball screw device and a motor that drives the rotating body, can be prevented from being shortened in life even when a load including a radial component is applied to the axially moving body.

Advantageous Effects of Invention

According to the present invention, the life of the ball screw device can be prevented from being shortened, even when a load having a radial component is applied to the axially moving body, by actively providing the tilt error of the axially moving body, as described above.

DESCRIPTION OF EMBODIMENT

Hereinafter, an embodiment of the present invention will be described with reference to the drawings.

Figure 1:
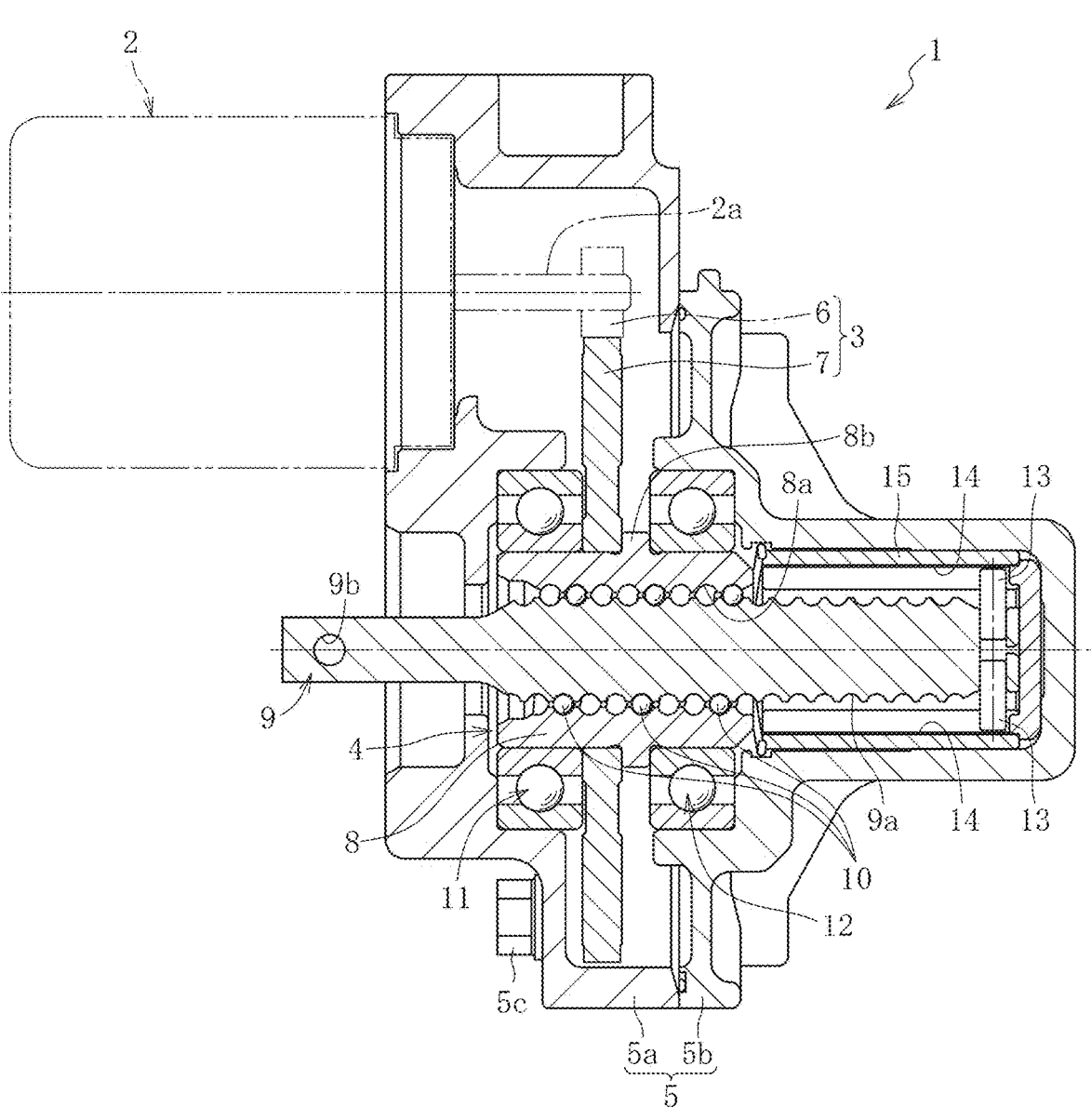
FIG. 1 is a cross-sectional view of an electric actuator.

An electric actuator 1 illustrated in FIG. 1 includes an electric motor 2, a transmission gear mechanism 3, a ball screw device 4 according to an embodiment of the present invention, and a case 5. The electric actuator 1 is a so-called parallel shaft type electric actuator in which the shaft center of the electric motor 2 and the shaft center of the ball screw device 4 are arranged away from and parallel to each other. In the illustrated example, the case 5 includes a first case Sa and a second case 5b, which are fixed by a bolt 5c in a state of being in axial contact with each other.

The transmission gear mechanism 3 includes a small-diameter gear 6 fixed to a rotating shaft 2a of the electric motor 2, and a large-diameter gear 7 meshing with the small-diameter gear 6 and fixed to a nut 8 (details will be described later) of the ball screw device 4. As a result, the rotational driving force of the electric motor 2 is decelerated by the transmission gear mechanism 3 and transmitted to the nut 8 of the ball screw device 4. Note that the transmission gear mechanism 3 is not limited to the above, and may be one that includes, for example, a gear having the same diameter and transmits the rotational driving force of the electric motor 2 to the nut 8 without decelerating the rotational driving force.

Figure 2:
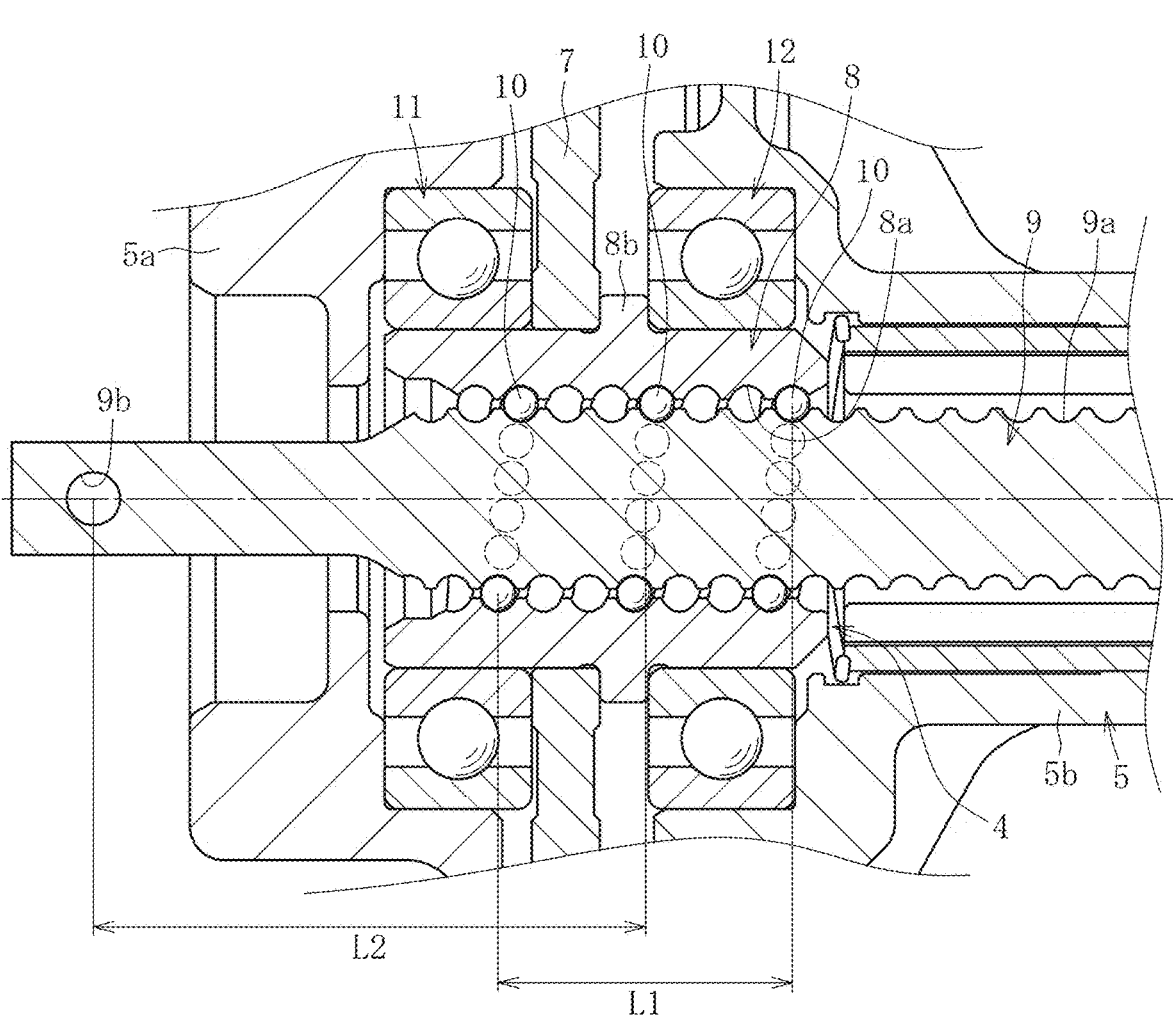
FIG. 2 is an enlarged view of FIG. 1.
Figure 3:
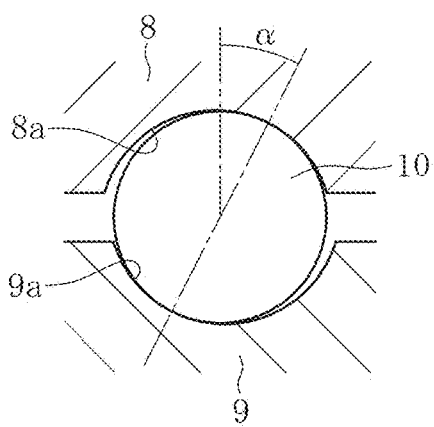
FIG. 3 is a cross-sectional view illustrating a contact state between a ball and a screw groove.

The ball screw device 4 includes the nut 8, a screw shaft 9, and a large number of balls 10. Spiral screw grooves 8a and 9a are formed in the inner peripheral surface of the nut 8 and the inner peripheral surface of the screw shaft 9, respectively, and the balls 10 are arranged between the screw grooves 8a and 9a. In the present embodiment, a plurality of (three rows in the illustrated example) circulation paths for circulating the balls 10 are provided as illustrated in FIG. 2. Each circulation path includes a rolling path formed by the screw groove 8a of the nut 8 and the screw groove 9a of the screw shaft 9, and a return path (not illustrated) for returning the ball 10 from the end point to the start point of the rolling path. In the illustrated example, each circulation path has the rolling path for one turn (360°). The screw grooves 8a and 9a, in which no ball 10 is arranged, are provided between the axial directions of the circulation paths adjacent to each other. The return path is formed of a known circulating member such as a tube or a circulating piece. When the ball screw device 4 is driven, the ball 10 and the screw grooves 8a and 9a are in angular contact with each other at a contact angle α, as illustrated in FIG. 3. The contact angle α is an angle with respect to the radial direction of a line connecting the contact points between the ball 10 and the screw grooves 8a and 9a, and is set to 30° to 45° in an initial state in which the nut 8 and the screw shaft 9 are coaxially arranged.

The nut 8 is attached to the case 5 via bearings 11 and 12. In the illustrated example, the outer ring of one bearing 11 is attached to the inner peripheral surface of the first case 5a, and the inner ring is fixed to the outer peripheral surface of the nut 8. The outer ring of the other bearing 12 is attached to the inner peripheral surface of the second case 5b, and the inner ring is fixed to the outer peripheral surface of the nut 8. The outer peripheral surfaces of the outer rings of the bearings 11 and 12 and the case 5 are fitted to each other via, for example, a minute radial gap. The inner peripheral surfaces of the inner rings of the bearings 11 and 12 and the nut 8 are fixed by, for example, press fitting. The nut 8 is rotatably supported with respect to the case 5 by these bearings 11 and 12.

The large-diameter gear 7 is fixed to the nut 8, and these are designed to be integrally rotatable. In the illustrated example, the large-diameter gear 7 is arranged between the axial directions of the bearings 11 and 12. In detail, an annular protrusion 8b is provided on the outer peripheral surface of the nut 8, and the first case Sa and the second case 5b apply a preload in the axial direction to the outer rings of the bearings 11 and 12. As a result, the large-diameter gear 7 and the annular protrusion 8b are sandwiched between the inner rings of the bearings 11 and 12 from both sides in the axial direction. Alternatively, the nut 8 and the large-diameter gear 7 may be integrally formed.

The screw shaft 9 and the nut 8 are formed of metal, for example, carbon steel, and subjected to heat treatment if necessary. Specifically, the screw shaft 9 is formed of, for example, a material obtained by subjecting an SUJ material (SUJ2 or the like) or an SC material (S45 C, S53C, or the like) to immersion quenching, or a material obtained by subjecting an SCr material or an SCM material to carburizing and quenching. The nut 8 is formed of, for example, a material obtained by subjecting an SCr material or an SCM material to carburizing and quenching.

An attachment hole 9b, as an attachment portion to which another member is to be attached, is provided at one end portion (end portion on the left side in the view) of the screw shaft 9. The attachment hole 9b serves as the point of action of a load applied to the screw shaft 9 from another member.

The ball screw device 4 is provided with a detent mechanism that restricts the rotation of the screw shaft 9. In the present embodiment, pins 13 provided on the screw shaft 9 and axial grooves 14 provided in the case 5 constitute the detent mechanism, as illustrated in FIG. 1. The pins 13 are provided near the other end portion (end portion on the right side in the view) of the screw shaft 9, and protrude radially outward from the cylindrical outer peripheral surface of the screw shaft 9. The axial grooves 14 are formed in a tubular engagement member 15 fixed to the inner peripheral surface of the second case 5b. In the illustrated example, the pins 13 and the axial grooves 14 are provided at two locations with 180° phase difference, and each pin 13 is inserted into the inner periphery of each axial groove 14. When the screw shaft 9 tries to turn together with the rotation of the nut 8, the pin 13 and the axial groove 14 engage in the rotational direction, thereby restricting the rotation of the screw shaft 9.

The screw shaft 9 is supported from the outer periphery by the nut 8 via the balls 10. The screw shaft 9 is not supported from the outer periphery at a portion other than the contact portions with the balls 10, and is supported from the outer periphery substantially only at contact portions with the balls 10. Note that the pins 13 provided on the screw shaft 9 are in contact with the axial grooves 14 of the case 5 in the rotational direction, but do not support the screw shaft 9 from the outer periphery. That is, "the screw shaft 9 is supported from the outer periphery substantially only at contact portions with the balls 10" means a state in which a member that restricts movement in all radial directions like a sliding bearing is not provided in a region of the screw shaft 9 other than the contact portions with the balls 10.

The distance between the screw groove 8a of the nut 8 and the screw groove 9a of the screw shaft 9 facing each other in the radial direction is slightly larger than the diameter of the ball 10. By this amount, the nut 8 is made radially movable with respect to the screw shaft 9. When it is assumed that the maximum amount of radial movement of the nut 8 with respect to the screw shaft 9 in a state in which the nut 8 and the screw shaft 9 are arranged in parallel is a radial gap Δr, it is normal design in the conventional ball screw devices to make the radial gap Δr as small as possible and make the tilt error of the screw shaft as small as possible. On the other hand, in the present invention, the tilt error of the screw shaft is actively provided by setting the radial gap Δr to be large. Specifically, the distance between the screw grooves 8a and 9a and the size of the ball 10 are set such that a tilt error, represented by a ratio Δr/L1 of the radial gap Δr to an axial span L1 between the large number of balls 10 (the distance between the centers of the balls 10 at the axial both ends. See FIG. 2.) is larger than ½000, preferably larger than ½000, and more preferably larger than 1.5/1000.

Figure 4:
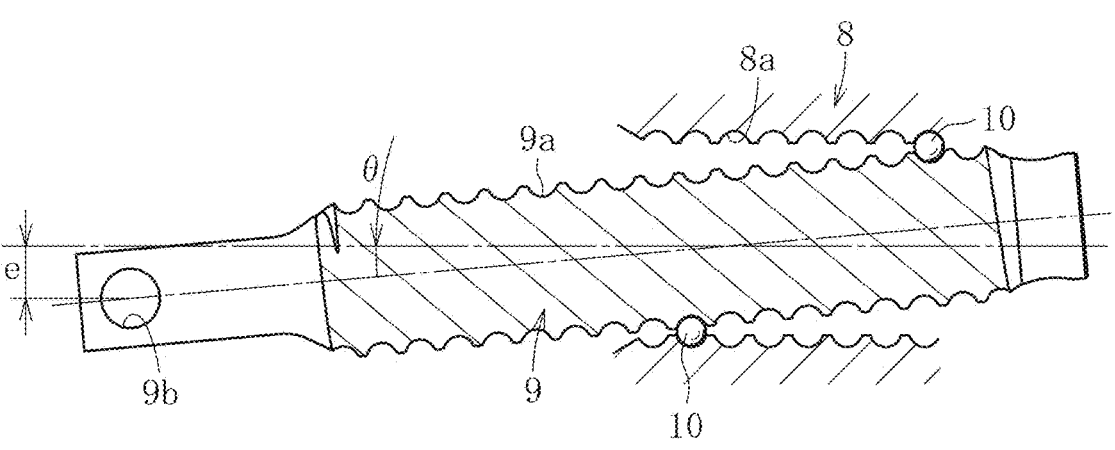
FIG. 4 is a cross-sectional view illustrating a state in which a screw shaft tilts with respect to a nut.

By actively providing the tilt error of the screw shaft 9 as described above, the tilt of the screw shaft 9 is allowed (the tilt angle is represented by θ) as exaggeratedly illustrated in FIG. 4. As a result, when a load having a radial component is applied to the attachment hole 9b of the screw shaft 9, the tilt of the screw shaft 9 is allowed, so that interference between the ball 10 and the screw grooves 8a and 9a can be avoided. As a result, early peeling of the surfaces of the ball 10 and the screw grooves 8a and 9a is prevented, the life of the ball screw device 4 can be prevented from being shortened, and eventually the life of the electric actuator 1 can be prevented from being shortened.

When a tilt error is provided in the screw shaft 9 as described above, a deflection amount e (see FIG. 4), in the direction orthogonal to the axis, of the attachment hole 9b of the screw shaft 9 increases. Therefore, when it is assumed that the axial distance between the point of action of load (i.e., the center of the attachment hole 9b) of the screw shaft 9 and the axial central portion of the large number of balls 10 is L2 (see FIG. 2), the tilt error Δr/L1 is preferably made smaller than 0.5/L2. As a result, the deflection amount e of the attachment hole 9b of the screw shaft 9 can be suppressed to 0.5 mm or less.

The electric actuator 1 is used in an application in which, for example, a wire is attached to the attachment hole 9b of the screw shaft 9 and the wire is pulled (e.g., an electric parking brake). Alternatively, it is used in an application in which the screw shaft 9 is in direct or indirect contact with a piston and hydraulic pressure is generated by axial movement of the screw shaft 9 (e.g., an electric hydraulic brake). In particular, when a load having a radial component is applied to the attachment hole 9b of the screw shaft 9, the electric actuator 1 (ball screw device 4) is suitably applied.

In the above embodiment, the ball screw device 4 of a nut rotation type that converts the rotation of the nut 8 into the axial movement of the screw shaft 9 has been described. But, without being limited thereto, the present invention may be applied to a ball screw device of a screw shaft rotation type that converts the rotation of the screw shaft 9 into the axial movement of the nut 8. Also in this case, it is effective similarly to the above embodiment to apply the present invention when the nut 8, which is an axially moving body, is supported from the outer periphery substantially only at the contact portions with the balls 10.

Example 1

Figure 5:
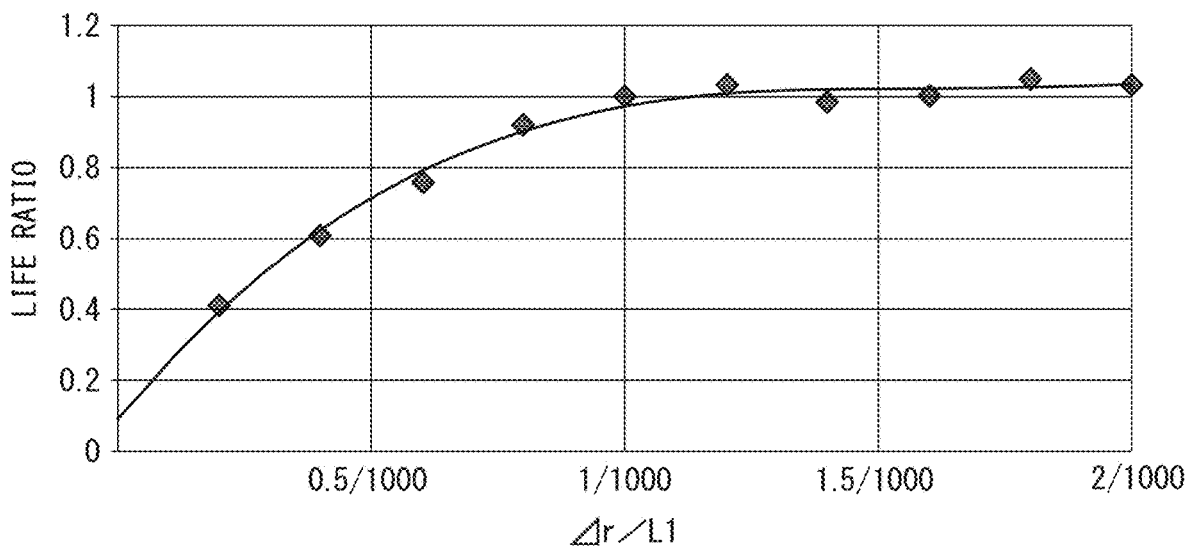
FIG. 5 is a graph illustrating a relationship between a tilt error of a screw shaft and a life ratio of a ball screw device.
Figure 6:
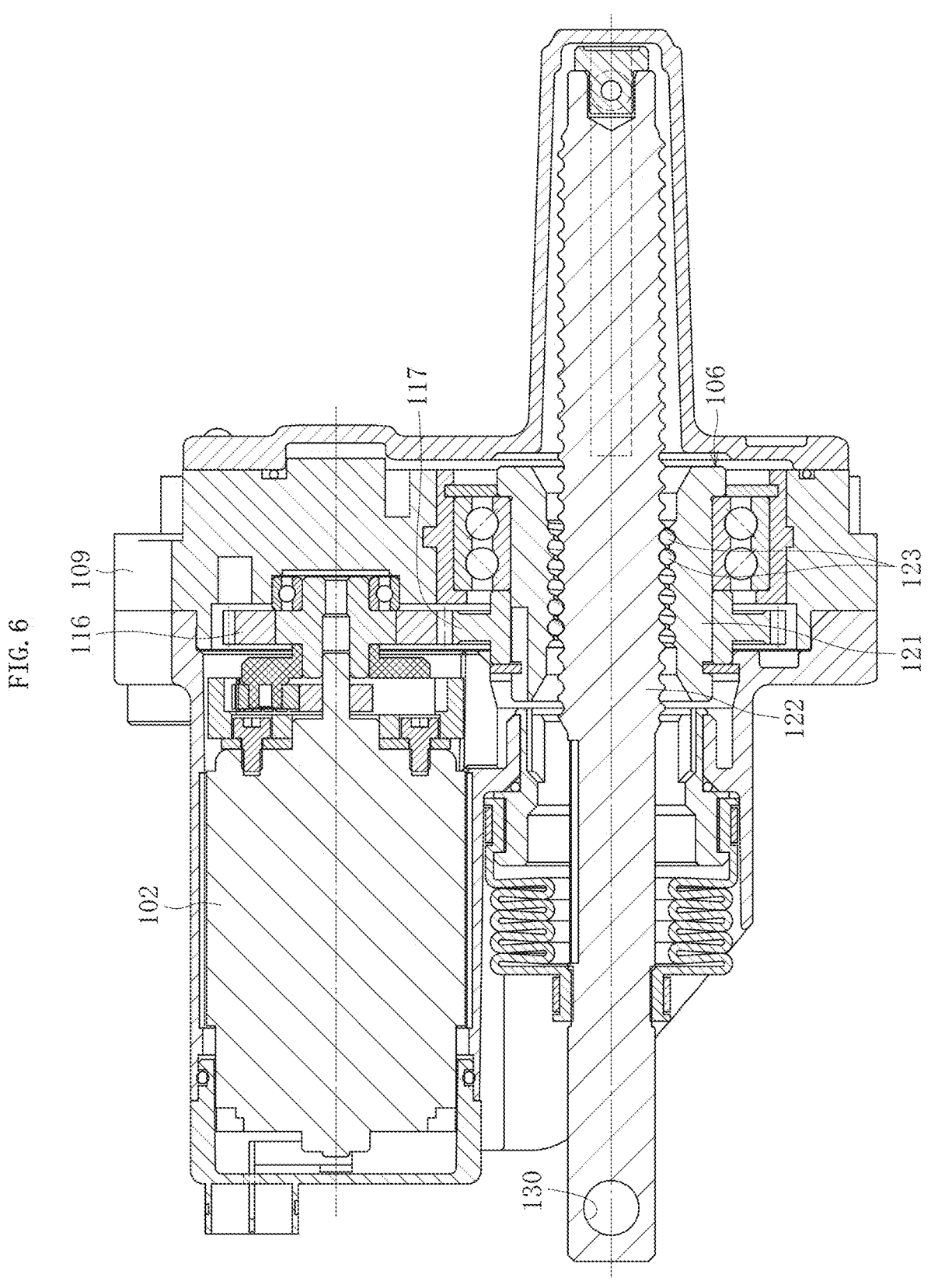
FIG. 6 is a cross-sectional view of a conventional electric actuator.

A plurality of ball screw devices having different tilt errors Δr/L1 of a screw shaft were prepared. The life (period until peeling occurs on the surface of a screw groove or a ball) when the screw shaft was reciprocated in the axial direction with a radial load applied to the tip of the screw shaft was measured. The results are shown in FIG. 5. The life ratio on the vertical axis is the ratio of the life when the life, with the tilt error Δr/L1 assumed to be ½000, is one.

As illustrated in FIG. 5, the life increases as the tilt error Δr/L1 increases from 0, and when the tilt error Δr/L1 is ½000 or more, the life ratio is maintained at a high value (near 1). From this result, it was confirmed that by actively providing the tilt error Δr/L1, the life can be made longer than when the tilt error is made small. Specifically, by setting the tilt error Δr/L1 to 0.5/1000 (=½000), a life of about 70% (life ratio of about 0.7) of the maximum life can be obtained. In addition, by setting the tilt error Δr/L1 to ½000 or more, and preferably to 1.5/1000 or more, the maximum life (life ratio of about 1) can be obtained.

REFERENCE SIGNS LIST

1 Electric actuator
2 Electric motor
3 Transmission gear mechanism
4 Ball screw device
5 Case
6 Small-diameter gear
7 Large-diameter gear
8 Nut
8a Screw groove
9 Screw shaft
9a Screw groove
9b Attachment hole (point of action of load)
10 Ball

The invention claimed is:
1. A ball screw device comprising:
a screw shaft having a screw groove formed in an outer peripheral surface;

a nut having a screw groove formed in an inner peripheral surface; and a plurality of balls arranged between the screw groove of the screw shaft and the screw groove of the nut, one of the screw shaft and the nut being caused to function as a rotating body and another of the screw shaft and the nut being caused to function as an axially moving body, wherein a ratio $\Delta r/L1$ of a radial gap $\Delta r$, which is a maximum amount of radial movement of the nut with respect to the screw shaft, to an axial span L1 between the plurality of balls is larger than $\frac{1}{2000}$.

2. The ball screw device according to claim 1, wherein the ratio $\Delta r/L1$ is smaller than 0.5/L2, L2 being an axial distance between a point of action of load provided on the axially moving body and an axial central portion of the plurality of balls.

3. The ball screw device according to claim 1, wherein the nut is caused to function as the rotating body, and the screw shaft is caused to function as the axially moving body.

4. The ball screw device according to claim 1, wherein the axially moving body is not supported from an outer periphery at a portion other than contact portions with the plurality of balls.

5. The ball screw device according to claim 1, wherein the ball screw device is configured to be applied with a load including a radial component at a point of action of load of the axially moving body.

6. An electric actuator comprising:

the ball screw device according to claim 1; and a motor that drives the rotating body.

* * * * *